UNITED STATES PATENT OFFICE.

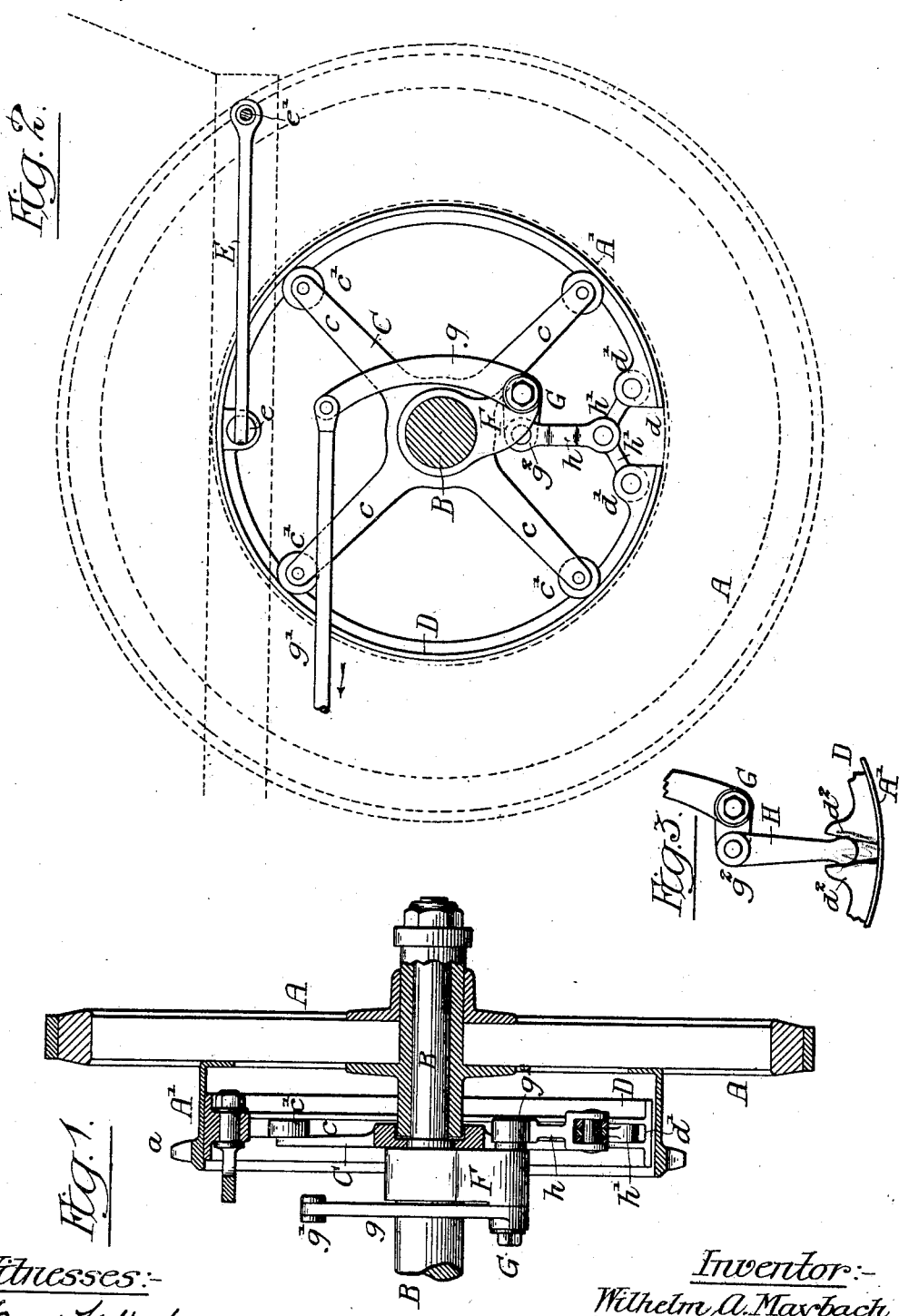

WILHELM A. MAYBACH, OF CANNSTADT, GERMANY, ASSIGNOR TO DAIMLER MANUFACTURING COMPANY, OF NEW YORK, N. Y., A CORPORATION OF NEW YORK.

BRAKE FOR MOTOR-VEHICLES.

SPECIFICATION forming part of Letters Patent No. 688,108, dated December 3, 1901.

Application filed March 28, 1901. Serial No. 53,340. (No model.)

*To all whom it may concern:*

Be it known that I, WILHELM AUGUST MAYBACH, a subject of the Emperor of Germany, and a resident of Cannstadt, in the Kingdom of Würtemberg, Germany, have invented certain Improvements in Brakes for Motor-Vehicles, of which the following is a specification.

The object of my invention is to provide a brake for motor-vehicles that will operate equally upon a wheel turning in either direction. This object I attain in the following manner, reference being had to the accompanying drawings, in which—

Figure 1 is a vertical sectional view illustrating my brake mechanism. Fig. 2 is a side view of the brake mechanism with the wheel in dotted lines, and Fig. 3 is a view of a modification.

In brakes for motor-vehicles heretofore used the majority of the band-brakes are so constructed as to operate when the vehicle is turning in one direction, and if the wheel is turning in the opposite direction the brake-band will not operate.

A is the wheel of a motor-vehicle, for instance, and can be of any type. This wheel is mounted on the axle B. Secured to the wheel is a deep-flanged sprocket-wheel A', in the present instance having teeth $a$, with which the drive-chain engages.

C is a carrier having four arms $c$ in the present instance, with carrying-rollers $c'$ at their extremities. This carrier is mounted on the axle B, as clearly shown in Fig. 1.

Supported by the carrier C is the brake-ring D. This brake-ring is split at $d$ and is preferably made of spring material. Attached to this brake-ring at $e$ is a link E, which in turn is attached to the frame of the vehicle at $e'$. Thus the brake-ring is prevented from turning in either direction. The link is so hung, however, that the ring will have free motion to accommodate itself to the axle. The link E has a pivot-pin $e$, and on one side of the pivot-pin is a collar and on the other side a washer and nut, as clearly shown in Fig. 1. Thus the brake-ring is held centrally by the arms of the carrier C and is prevented from turning with the wheel in either direction by the link E.

Secured to the axle B is a bracket F, and having its bearing in the bracket is a rock-shaft G. On this rock-shaft is an arm $g$, connected by a rod $g'$ to the brake-operating lever of the vehicle. Also on the rock-shaft G is a short arm $g^2$, connected to the ends $d'$ of the ring D by links $h$ $h'$ $h'$, so that if the operating-rod $g'$ is moved in the direction of the arrow, Fig. 2, it will cause the shaft G to rock in its bearings and force the ends $d'$ of the brake-ring apart, and consequently the brake-ring will be forced into frictional contact with the flange A' of the wheel A. By this arrangement the brake can be applied whether the vehicle is going forward or backward. In one case the link is under tension and in the other case it is under compression. When the spring brake-ring is released from the control of the lever G, it will be drawn away from the flange A of the wheel A' and will be held centrally clear of the flange by the arms of the carrier C. Thus friction and noise are avoided.

The ends of the brake-ring D may be formed as shown in Fig. 3. The inclined surfaces $d^2$ are spaced to allow a finger H hung to the arm $g^2$ of the lever G to be forced into the space between the inclined edges $D^2$ of the ring D and force the edges apart.

In the drawings I have shown a wheel having a flanged sprocket-wheel attached thereto; but it will be understood that the plain flange may be used and any form of wheel may be used without departing from my invention.

I claim as my invention—

1. The combination in a vehicle-brake, of a wheel, an axle therefor, a split brake-ring constructed to be forced into frictional contact with the interior surface of said wheel, a carrier for the brake-ring supported on the axle, a bracket also carried by the axle, a rock-shaft supported by the bracket, two arms fixed to said shaft, a toggle connecting one of said arms to the two ends of the brake-ring, and an operating-lever connected to the other arm for turning the rock-shaft, substantially as described.

2. The combination in a brake-ring for vehicles, of a wheel, a brake-ring arranged to be forced into frictional contact therewith, a link connecting the brake-ring to the body of the vehicle, a bracket on the axle, a rock-shaft, operating means connected to the said shaft, and links forming a toggle connecting the shaft with the brake-ring so that on moving the rock-shaft the brake-ring will be expanded and contracted, substantially as described.

3. The combination in a vehicle-brake, of an axle, a wheel thereon, a flange on the wheel, a carrier on the axle, arms on the carrier, friction-wheels on said arms, a spring brake-ring mounted on the wheels of the carrier and connected to the vehicle-body, and means for forcing the brake-ring in contact with the flange of the wheel, substantially as described.

4. The combination of an axle, a wheel mounted thereon, a flange on the wheel, a carrier on the axle, a split spring brake-ring mounted on the carrier, a link connecting the brake-ring with the body of the vehicle, a bracket on the axle, a lever connection, and a link connecting one arm of the lever to the ends of the brake-ring, the other arm of the lever being connected to the operating means, substantially as described.

In testimony whereof I have signed my name to this specification in the presence of two subscribing witnesses.

WILHELM A. MAYBACH.

Witnesses:
WM. HAHN,
H. E. REICHARDT.